United States Patent [19]

Bauer

[11] 4,240,469
[45] * Dec. 23, 1980

[54] REVERSING VALVE CONSTRUCTION AND PARTS THEREFOR AND METHODS OF MAKING THE SAME

[75] Inventor: Werner R. Bauer, Richmond, Va.

[73] Assignee: Robertshaw Controls Company, Richmond, Va.

[*] Notice: The portion of the term of this patent subsequent to Feb. 19, 1997, has been disclaimed.

[21] Appl. No.: 958,030

[22] Filed: Nov. 6, 1978

Related U.S. Application Data

[63] Continuation-in-part of Ser. No. 825,958, Aug. 19, 1977, Pat. No. 4,188,975.

[51] Int. Cl.³ ............................................. E03B 3/00
[52] U.S. Cl. ......................... 137/625.66; 137/625.25; 251/175; 251/176
[58] Field of Search .................. 137/625.66, 625.63, 137/625.64, 625.25, 625.43; 251/175, 176

[56] References Cited

U.S. PATENT DOCUMENTS

| 3,032,312 | 5/1962 | Greenawalt | 137/625.13 X |
| 3,349,800 | 10/1967 | Herion | 137/625.66 |
| 3,369,790 | 2/1968 | McHale | 251/176 X |
| 3,990,676 | 11/1976 | Brownstein | 251/175 |

*Primary Examiner*—Harold W. Weakley
*Attorney, Agent, or Firm*—Candor, Candor & Tassone

[57] ABSTRACT

A reversing valve construction having a housing provided with a chamber carrying a movable valve member therein that controls ports of a valve seat of the housing through the relative position of a cavity of the valve member relative to the ports, a one-piece flexible sealing skirt being carried by the valve member and extending outwardly therefrom in a cantilevered manner adjacent the valve seat so as adapted to be exposed to fluid pressure in the chamber that will act directly thereon and cause the flexible skirt to flex and engage the valve seat in a manner to tend to sealingly conform to the contour of the valve seat and thereby seal the cavity to the valve seat while permitting sliding movement therebetween. A spring in the housing acts on the flexible skirt to urge the same toward the valve seat.

15 Claims, 24 Drawing Figures

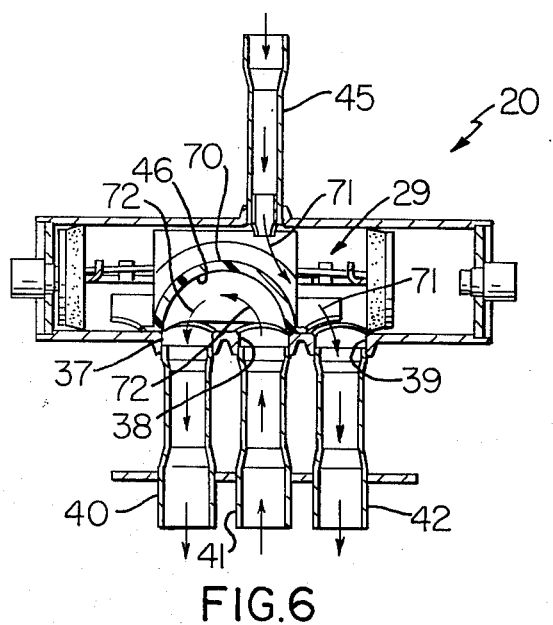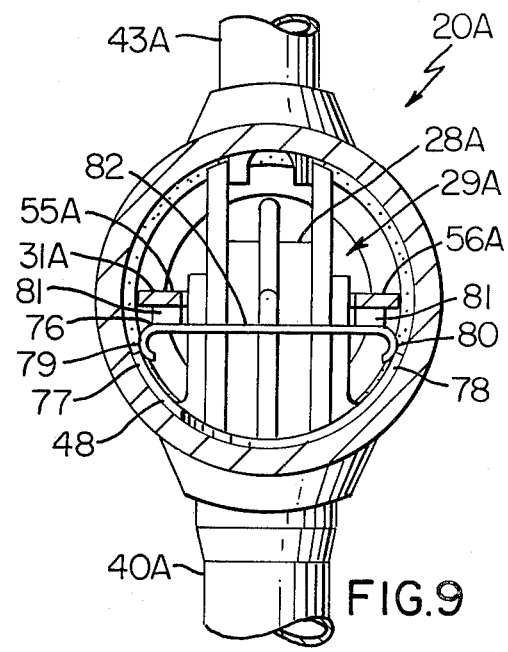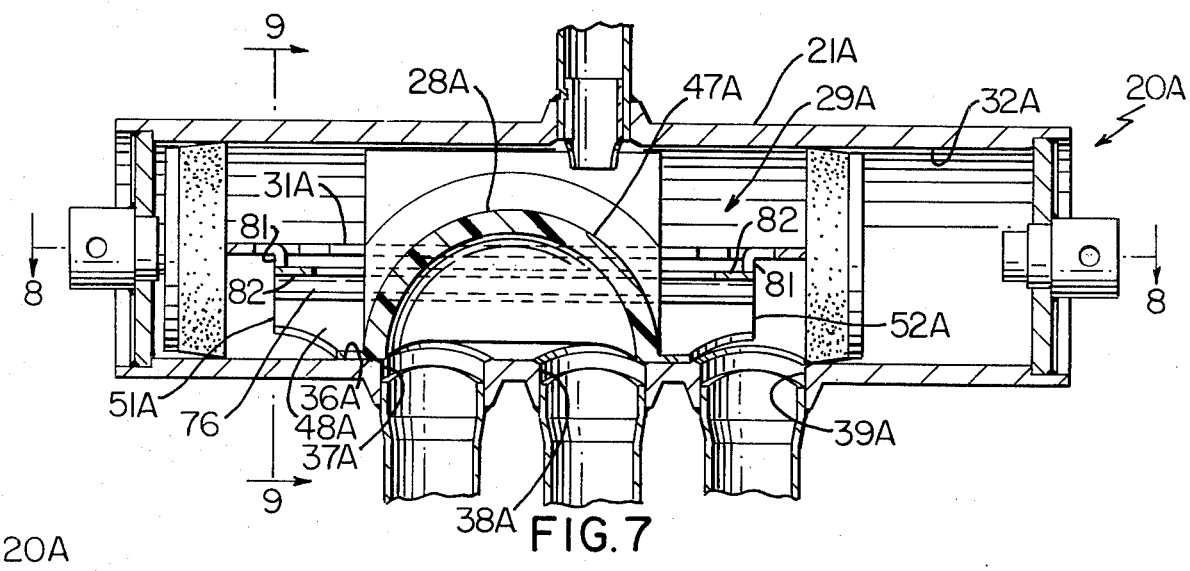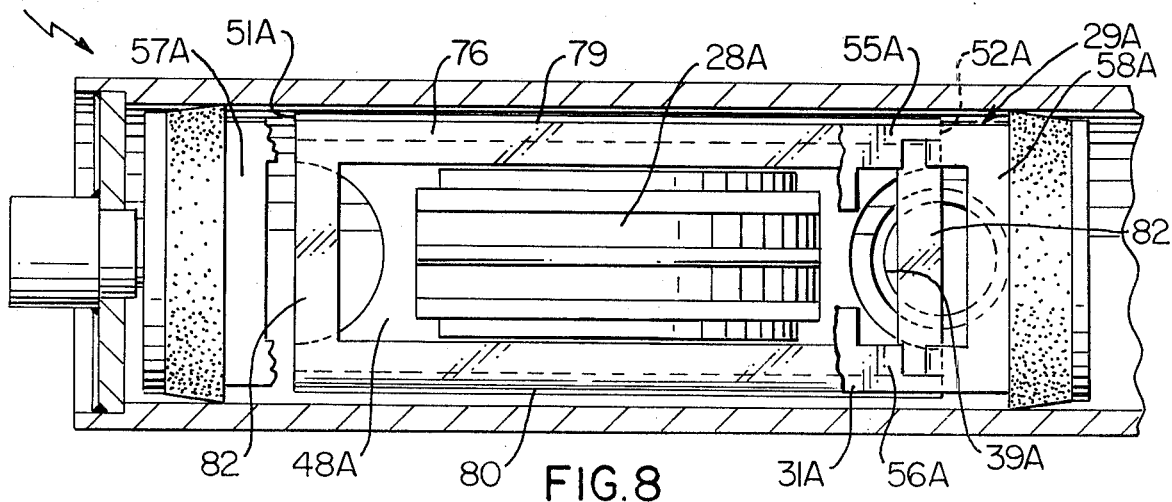

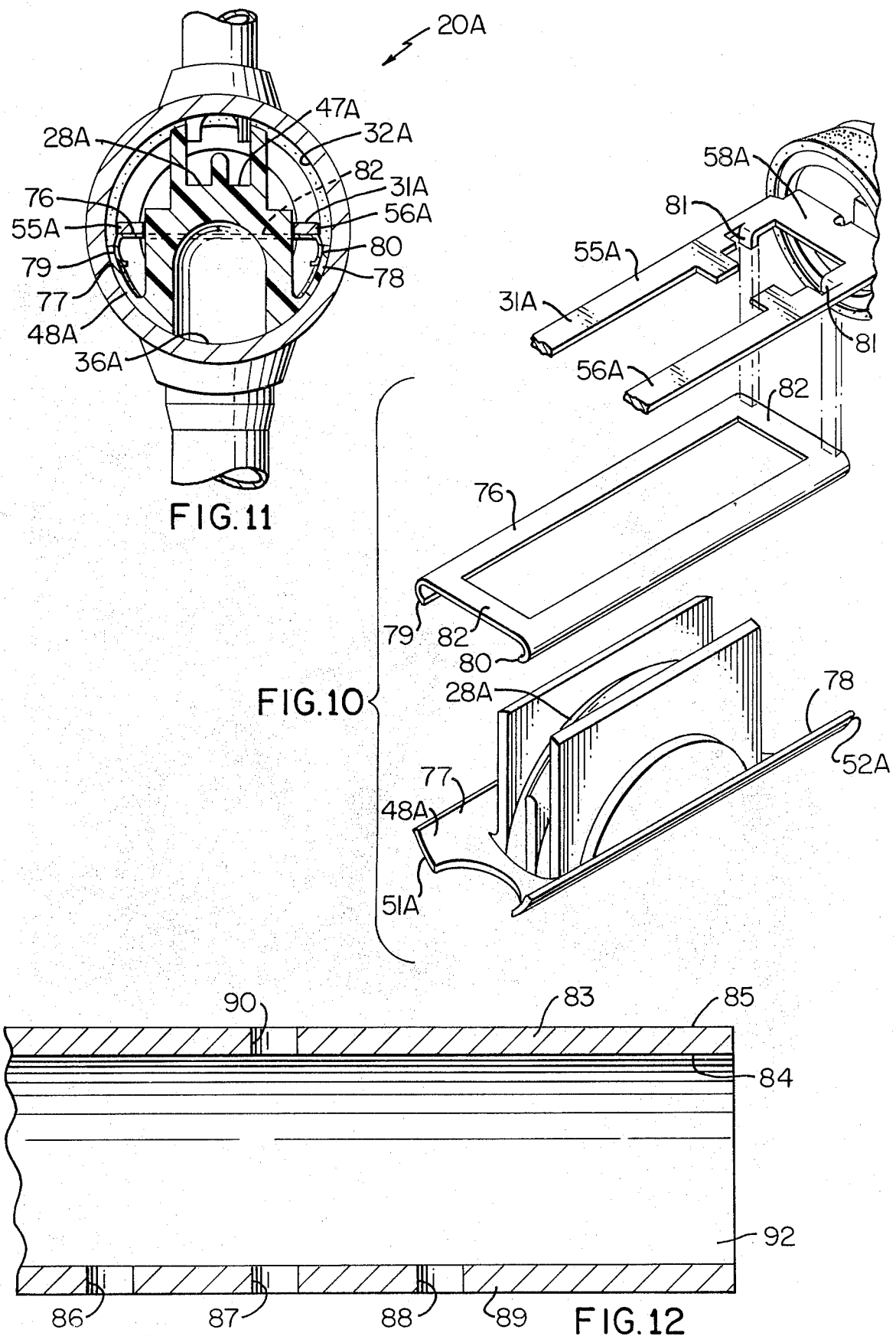

REVERSING VALVE CONSTRUCTION AND PARTS THEREFOR AND METHODS OF MAKING THE SAME

CROSS REFERENCE TO RELATED APPLICATIONS

This application is a Continuation-In-Part application of its parent co-pending patent application, Ser. No. 825,958, filed Aug. 19, 1977, now U.S. Pat. No. 4,188,975.

BACKGROUND OF THE INVENTION

1. Field of the Invention

This invention relates to an improved reversing valve construction and to improved parts therefor as well as to methods of making such a reversing valve construction and improved parts therefor.

2. Prior Art Statement

It is well known that reversing valve constructions for heat pump sytems and the like have been provided wherein each includes a housing means carrying a movable piston-like valve member that controls port means of a valve seat means of the housing means through the relative position of passage means of the valve member relative to the port means.

For example, see the following four U.S. Pat. Nos:
(1) 3,032,312-Greenawalt
(2) 3,056,574-Greenawalt
(3) 3,357,453-Mingrone et al
(4) 3,985,154-Hargraves Each reversing valve construction of the above item (1)–(4) appears to have a rigid and non-flexible valve member disposed in sliding contact with its cooperating valve seat surface, the first three above items each having the valve seat means thereof formed by a separate part disposed and secured in the housing means and being provided with a flat surface against which a flat surface of the movable valve member engages and slides in sealing relation therewith whereas the above patent to Hargraves has the valve seat means formed from a non-formed part of a cylindrical tubular housing member so as to be provided with an arcuate surface against which an arcuate surface of the valve member slides in sealing relation therewith.

Actual production devices that appear similar to the above four patents were examined and those similar to Mingrone et al and Hargraves were found to have rigid metallic surfaces of the valve members to be disposed in sliding relation with respective metallic surfaces of the valve seat means, the device similar to the U.S. Pat. to Greenawalt, No. 3,032,312 was found to have a non-flexible and rigid plastic annular part forming the sliding surface of the valve member and being captured at its inner and outer peripheries by metallic retainers of the valve member whereby the entire valve member is rigid, and the device similar to the U.S. Pat. to Greenawalt, No. 3,056,574 was found to have the entire valve member formed of plastic material and of such a thickness that the same is not flexible.

To prevent inward deformation of the sidewall of the valve member by outside pressure thereon, the U.S. Pat. to Greenawalt, No. 3,032,312 has a reinforcing pin disposed transversely in the cavity of the valve member adjacent the valve seat surface.

It is also known to form ports through the side wall of a tubular member by drawing a small opening in the side wall means from inside the tubular member to the outside thereof by the method of pulling a bullet-shaped member through such small opening from the inside to the outside thereof whereby a drawn port is formed with a surrounding collar extending outwardly from the external side wall of the tubular member. Such tubular members have been utilized in the heat exchange field, such as for forming solar energy panels and the like.

For example, see the Mar. 14, 1977, Business Week article entitled "This Drill Puts The T Into Tubing."

SUMMARY OF THE INVENTION

It has been found that the efficiency of each reversing valve construction depends on the leakage and pressure drop characteristics across the valve member thereof so that the closer the tolerances can be made between the main surfaces of the valve member and the valve seat means, the more efficient is the resulting reversing valve construction.

It was found according to the teachings of the invention set forth in applicant's co-pending patent application, Ser. No. 825,956, filed Aug. 19, 1977, that improved sealing means can be provided between such a movable valve member and its cooperating valve seat means to improve the efficiency of the resulting reversing valve construction.

In particular, one embodiment of that invention provides a flexible sealing member disposed between the valve member of the reversing valve construction and the valve seat means thereof to seal the cavity or passage means of the valve member to the valve seat means while permitting sliding movement therebetween, the flexible sealing member being urged into sealing engagement with the valve seat means by biasing means that is operatively associated with the valve member and the flexible sealing member.

It is also a feature of applicant's other copending patent application, Ser. No. 825,957, filed Aug. 19, 1977, to utilize such a sealing means with the housing means and a valve member similar to those disclosed in the aforementioned U.S. Pat. to Hargraves, No. 3,985,154.

In particular, one embodiment of the reversing valve member of that invention provides a housing means that has the valve seat means thereof formed with an arcuate cross-sectional surface, the valve member also being formed with an arcuate cross-sectional surface disposed adjacent the arcuate surface of the valve seat means whereby the flexible sealing member is disposed intermediate the arcuate surfaces.

In this manner, the housing means of that invention can be made from a tubular member in the same manner as the housing means of the aforementioned U.S. Pat. to Hargraves, No. 3,985,154, as a part of the cylindrical side wall means of the tubular housing member forms the valve seat means without further forming thereof.

It is a feature of the aforementioned parent co-pending patent application to provide an improved valve member for a reversing valve construction, such as for any one of the aforementioned and described reversing valve constructions.

In particular, one embodiment of the valve member of the parent application has a one-piece flexible sealing skirt carried by the valve member and extending outwardly therefrom in a cantilevered manner so as to be disposed adjacent the valve seat means of the respective reversing valve construction so as adapted to be exposed to fluid pressure in the chamber that will act directly thereon and cause the flexible skirt to flex and engage the valve seat means in a manner to tend to sealingly conform to the contour of the valve seat means and thereby seal the passage means of the valve member to the valve seat means while permitting sliding movement therebetween.

However, it was found according to the teachings of this invention that the sealing effect of such flexible sealing skirt can be improved if biasing means is disposed in the housing means to act on the flexible skirt to further urge the same toward the valve seat means.

Accordingly, one embodiment of this invention provides a reversing valve construction having a housing means provided with a chamber carrying a movable valve member therein that controls port means of a valve seat means of the housing means through the relative position of passage means of the valve member relative to the port means. A one-piece flexible sealing skirt is carried by the valve member and extends outwardly therefrom in a cantilevered manner adjacent the valve seat means so as adapted to be exposed to fluid pressure in the chamber that will act directly thereon and cause the flexible skirt to flex and engage the valve seat means in a manner to tend to sealingly conform to the contour of the valve seat means and thereby seal the passage means to the valve seat means while permitting sliding movement therebetween. Biasing means is disposed in the housing means and acts on the flexible skirt to urge the same toward the valve seat means.

As previously stated, it is very important to have a low pressure drop in a reversing valve construction and it also has been found according to the teachings of this invention that a valve member for a reversing valve construction can be formed in such a manner that the shape thereof will provide for a smooth reversal of the flow direction of the reversing valve construction whereby the different flow patterns produced thereby will be substantially turbulent free and result in a lower pressure drop.

Accordingly, another embodiment of this invention provides a reversing valve construction having a housing means provided with a chamber having a movable valve member therein that controls port means of a valve seat means of the housing means through a relative position of the cavity of the valve member relative to the port means, the port means comprising first, second and third ports in aligned relation with the cavity bridging the first and second ports while exposing the chamber to the third port when the valve member is in one position thereof and bridging the second and third ports while exposing the chamber to the first port when the valve member is in another position thereof. The cavity of the valve member has a cross-sectional configuration in a direction parallel with the aligned ports that is substantially semicircular with a radius that extends from a point that is substantially equidistant between two of the ports and a point on the outboard edge of either of those two ports. The cavity also has a cross-sectional configuration in a direction transverse to the aligned ports that has a substantially semicircular top with a diameter that extends substantially between diametrically opposed edges of one of the ports.

It was also found according to the teachings of this invention that the pressure differential acting across the valve member of a reversing valve construction has a tendency to cause the sidewall means of the valve member to inwardly collapse or deform and thereby reduce the smooth fluid flow path desired in the cavity of the valve member.

Thus, it is another feature of this invention to provide a cross member in the cavity of the valve member to prevent inward collapsing of the sidewall means thereof with such cross member assisting in maintaining a smooth fluid flow pattern in the cavity of the valve member.

Accordingly, another embodiment of this invention provides a reversing valve construction having a housing means provided with a chamber having a movable valve member therein that controls port means of a valve seat means of the housing means through a relative position of the cavity of the valve member relative to the port means, the port means comprising first, second and third ports in aligned relation with the cavity bridging the first and second ports while exposing the chamber to the third port when the valve member is in one position thereof and bridging the second and third ports while exposing the chamber to the first port when the valve member is in another position thereof. The cavity of the valve member has a cross-sectional configuration in a direction parallel with the aligned ports that is substantially semicircular with a radius that extends from a point that is substantially equidistant between two of the ports and a point on the outboard edge of either of those two ports. The cavity also has a cross-sectional configuration in a direction transverse to the aligned ports that has a substantially semicircular top with a diameter that extends substantially between diametrically opposed edges of one of the ports. A cross member is disposed in the cavity of the valve member to be carried thereby and is disposed transverse to the aligned ports so as to be intermediate the two ports being bridged by the cavity.

Another feature of this invention for reducing the tendency of the sidewall means of the valve member to inwardly deform because of the pressure differential acting across the same is to form the valve member of a relatively hard material while the flexible skirt therefor is formed from a relatively flexible material that is subsequently secured to the valve member.

Accordingly, another embodiment of this invention provides a reversing valve construction having a housing means provided with a chamber carrying a movable valve member therein that controls port means of a valve seat means of the housing means through the relative position of passage means of the valve member relative to the port means. A one-piece flexible sealing skirt is carried by the valve member and extends outwardly therefrom in a cantilevered manner adjacent to the valve seat means so as to be adapted to be exposed to fluid pressure in the chamber that will act directly thereon and cause the flexible skirt to flex and engage the valve seat means in a manner to tend to sealingly conform to the contour of the valve seat means and thereby seal the passage means to the valve seat means while permitting sliding movement therebetween. The flexible sealing skirt is formed of a material that is more flexible than the material from which the valve member is formed.

In order to reverse the direction of the fluid flow in a heat pump system or the like, the valve member of the reversing valve construction must move over the port means of the valve seat whereby it was found according to the teachings of this invention that the port means must have a smooth edge or the valve member will tend to wear out against the same.

It was also found according to the teachings of this invention that such port means can be formed in a unique manner so as to provide a smooth surface against which the movable valve member of this invention can sealingly engage and move over without adverse wear.

In particular, one embodiment of this invention comprises a method of making a tubular housing member for a reversing valve construction wherein the tubular housing member has a portion of the internal cylindrical side wall means thereof defining a valve seat means with that portion being interrupted by a plurality of ports passing through the side wall means to be controlled by a valve member subsequently disposed in the tubular housing member, the method comprising the steps of forming each of the ports by drawing the side wall means of the tubular housing member from the inside thereof to the outside thereof whereby a resulting smooth surface for the ports is provided on the inside surface of the tubular housing member.

Accordingly, it is an object of this invention to provide an improved reversing valve construction having one or more of the novel features of this invention as set forth above or hereinafter shown or described.

Another object of this invention is to provide a method of making such a reversing valve construction, the method of this invention having one or more of the novel features of this invention as set forth above or hereinafter shown or described.

Another object of this invention is to provide an improved part for a reversing valve construction, the improved part of this invention having one or more of the novel features of this invention as set forth above or hereinafter shown or described.

Another object of this invention is to provide a method of making such an improved part, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

BRIEF DESCRIPTION OF THE DRAWINGS

FIG. 6 is a small view similar to FIG. 1 and illustrates the smooth flow pattern produced by the reversing valve construction of FIG. 1.

FIG. 7 is a fragmentary view similar to FIG. 1 and illustrates another embodiment of the reversing valve construction of this invention.

FIG. 8 is an enlarged, fragmentary, cross-sectional view taken on line 8—8 of FIG. 7.

FIG. 9 is an enlarged cross-sectional view taken on line 9—9 of FIG. 7.

FIG. 10 is an exploded perspective view of certain parts of the reversing valve construction of FIG. 7.

FIG. 11 is a view similar to FIG. 4 and illustrates another embodiment of the reversing valve construction of this invention.

FIG. 12 is a fragmentary cross-sectional view illustrating one step of in the method of this invention for forming a tubular housing member for a reversing valve construction of this invention.

DESCRIPTION OF THE PREFERRED EMBODIMENTS

Figure 1:
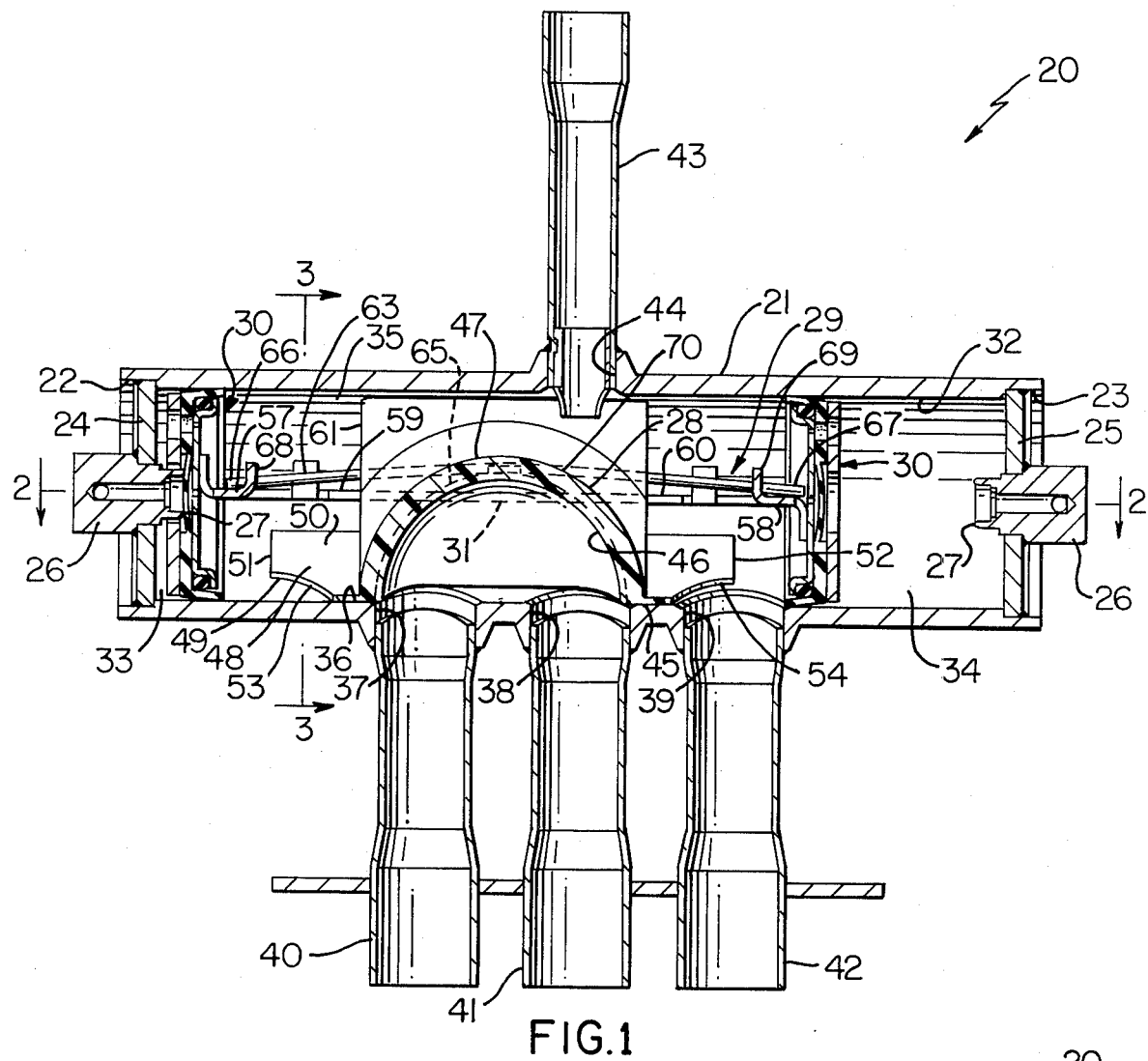
FIG. 1 is a cross-sectional view of one embodiment of the reversing valve construction of this invention.

While the various features of this invention are hereinafter described and illustrated as being particularly adapted to provide a reversing valve construction for a heat pump system, it is to be understood that the various features of this invention can be utilized singly or in any desired combination thereof to provide a reversing valve construction for other systems as desired.

Therefore, this invention is not to be limited to only the embodiments illustrated in the drawings, because the drawings are merely utilized to illustrate one of the wide variety of uses of this invention.

Referring now to FIG. 1, an improved reversing valve construction of this invention is generally indicated by the reference numeral 20 and comprises a cylindrical tubular housing means 21 formed by the method of this invention in a manner hereinafter described and having opposed open ends 22 and 23 thereof closed by disc-like end members 24 and 25 which respectively carry valve seat members 26 that project into the tubular housing member 21 beyond the respective disc members 24 and 25 so as to dispose the valve seats 27 inboard of the respective end members 24 and 25 for a purpose hereinafter described.

A movable valve member 28 of this invention is slidingly disposed in the housing means 21 and is operatively interconnected to a piston unit that is generally indicated by the reference numeral 29 so as to be moved thereby in a manner hereinafter described, the piston unit 29 including a pair of opposed piston head assemblies that are generally indicated by the reference numeral 30 and are interconnected together by a rigid guide member or bar 31 as will be apparent hereinafter.

The piston head assemblies 30 sealingly cooperate with the internal cylindrical peripheral surface 32 of the housing means 21 and end closures 24 and 25 to define end control chambers 33 and 34 therewith and separate the end control chambers 33 and 34 from a main central chamber 35 disposed between the piston head assemblies 30 and containing the valve member 28 therein.

A portion 36 of the internal peripheral surface 32 of the tubular housing member 21 defines an arcuate valve seat that is interrupted by three ports 37, 38 and 39 respectively fluidly interconnected to metallic tubular connectors 40, 41 and 42 while a similar metallic tubular connector 43 is disposed in fluid communication with a port 44 formed in the tubular housing member 21 opposite to the valve seat 36 as illustrated.

The movable valve member 28 is disposed in sliding and sealing engagement with the valve seat means 36 and has an arcuate surface 45 interrupted by a cavity or passage means 46 which is adapted to fluidly and sealingly interconnect the ports 37 and 38 of the valve seat 36 together when the valve member 28 is disposed in the position illustrated in FIG. 1 while the port 29 is permitted to be disposed in fluid communication with the central chamber 35 of the housing means 21 and, thus, to the tubular connector 43 as illustrated. However, when the valve member 28 is moved to the right in FIG. 1 by the piston unit 29, the cavity 46 of the valve member 28 fluidly and sealingly interconnects the ports 38 and 39 together while permitting the port 37 to be disposed in fluid communication with the main internal chamber 35 of the housing means 21 and, thus, in fluid communication with the tubular connector 43 for a purpose hereinafter described.

The movement of the valve member 28 relative to the housing means 21 is accomplished by directing fluid pressure to one of the control chambers 33 and 34 by suitable external pilot valve means (not shown) in a manner well known in the art whereby such fluid pressure is adapted to be directed to either chamber 33 or 34 through the respective valve seat 27 to act on the respective piston head assembly 30 to drive the piston unit 29 away from the pressurized control chamber 33 or 34 while the non-pressurized control chamber 34 or 33 is adapted to be exhausted out through its respective valve seat 27 in a manner well known in the art.

As previously stated, the reversing valve construction 20 of this invention can be adapted to be utilized in a heat pump system wherein a refrigerant compressor (not shown) is adapted to have the inlet side thereof interconnected to the middle tubular connector 41 while the output side thereof is interconnected to the upper tubular connector 43. An inside coil of such heat pump system is adapted to have one side thereof interconnected to the tubular connector 40 while the other side of such inside coil is interconnected by an expansion capillary passage to one side of an outside coil that has its other side interconnected to the tubular connector 42 in a manner well known in the art.

Thus, when the valve member 28 of the reversing valve construction 20 of this invention is disposed in the position illustrated in FIG. 1, by means of fluid pressure having been directed into the control chamber 34 while the left hand valve seat 27 exhausted the chamber 33, the heat pump system is acting in a cooling cycle as the hot gas output from the output side of the compressor is being directed through the main chamber 35 of the reversing valve construction 20 by the connector 43 and into the tubular connector 42 and, thus, to the outside coil which then returns the fluid pressure through the expansion capillary passage to the inside coil and through the interconnected ports 37 and 38 of the valve seat 36 to the inlet side of the compressor whereby the inside coil provides its cooling function.

Should it be desired to reverse the heat pump system to a heating cycle thereof, the pilot valve means is actuated in a manner well known in the art so as to direct fluid pressure to the end control chamber 33 through the left hand valve seat 27 while exhausting the control chamber 34 through the right hand valve seat 27 to cause the piston unit 29 to move the movable valve member 28 to the right in FIG. 1 to now interconnect the ports 38 and 39 together through the cavity 46 of the valve member 28. In this manner, the flow of hot gases from the outlet of the compressor is now directed from the chamber 35 to the port 37 of the valve seat 36 and, thus, to the inside coil which now performs its heating function. The return from the inside coil is directed to the expansion capillary passage to the outside coil and, thus, from the outside coil through the interconnected ports 39 and 38 of the valve seat 36 back to the inlet side of the compressor in a manner well known in the art.

Thus, it can be seen that the reversing valve construction 20 of this invention can be utilized to reverse the cycle of operation of a heat pump system in the above manner.

As the particular details of forming the piston head assemblies 30 to sealingly engage the internal peripheral surface 32 of the housing means 21 as well as to close off the respective valve seats 27 when disposed thereagainst is the subject matter of the claimed invention set forth in the co-pending patent application, Ser. No. 958,029, filed Nov. 6, 1978 (Robertshaw Controls Company), and as such features do not form any part of this invention, further description of the details of the piston head assemblies 30 and valve seats 27 will not be provided in this application as any desired information concerning the same can be obtained from the aforementioned co-pending patent application.

However, as previously set forth, one of the features of this invention is to provide improved sealing of the valve member 28 against the arcuate valve seat surface 36 of the tubular housing member 21 and such structure of the valve member 28 and method of making the same will now be described.

Figure 3:
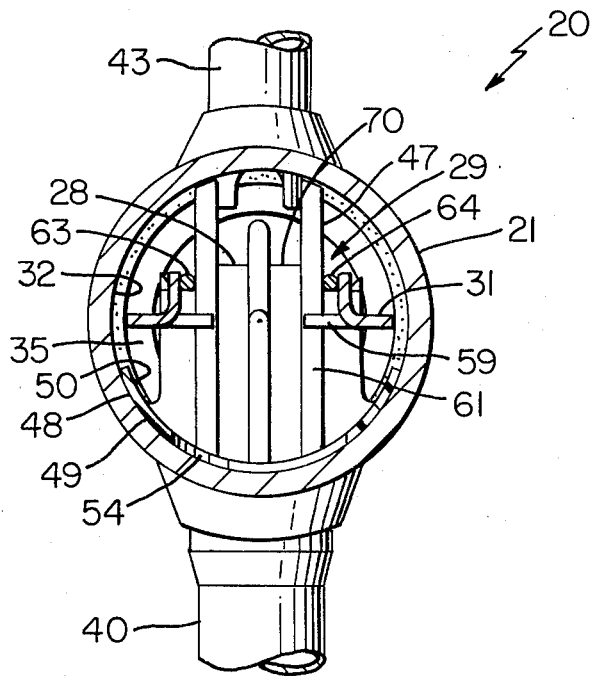
FIG. 3 is an enlarged cross-sectional view taken on line 3—3 of FIG. 1.
Figure 4:
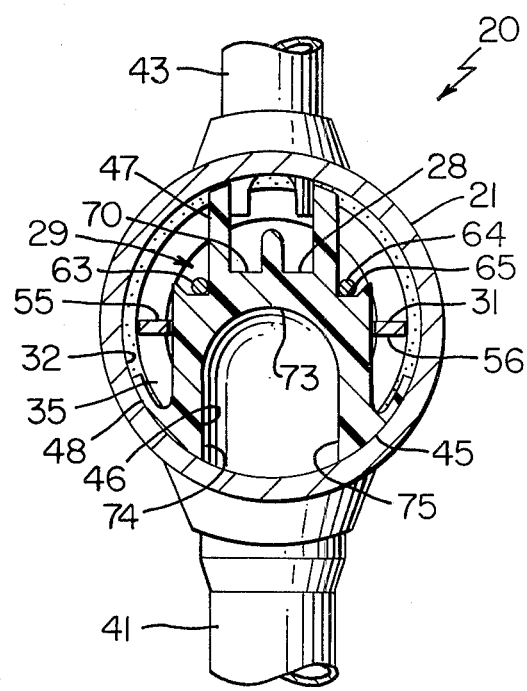
FIG. 4 is a cross-sectional view taken on line 4—4 of FIG. 2.
Figure 5:
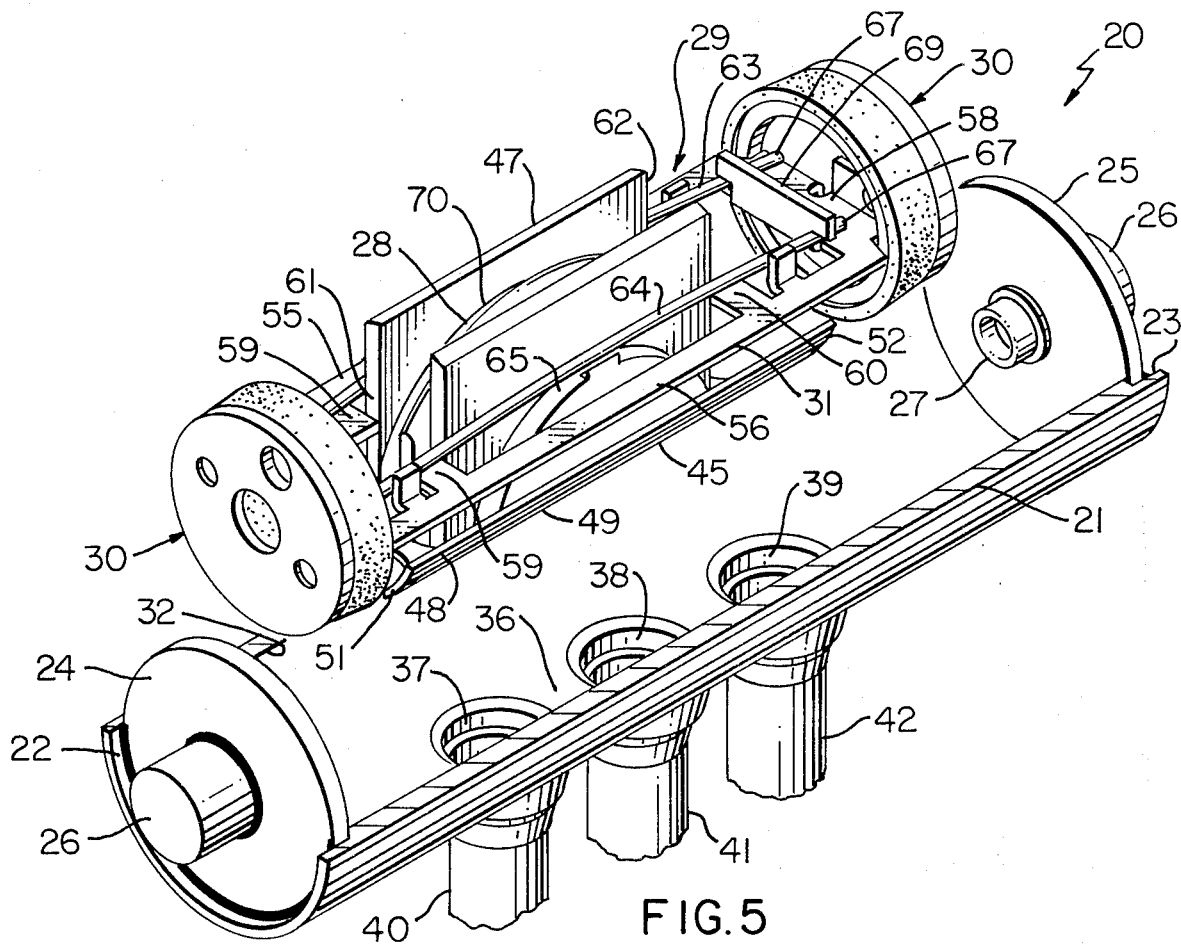
FIG. 5 is an exploded perspective view of certain parts of the reversing valve construction of FIG. 1.

The valve member 28 can be formed of any suitable material, and in the embodiment illustrated in the drawings, the valve member 28 is formed of molded plastic material, such as polytetrafluoroethylene, sold under the Trade Name "TEFLON-TFE" by the I. E. DuPont de Neumours, Inc., of Wilmington, Delaware, and comprises a main body portion 47 having the lower arcuate surface 45 thereof integrally interconnected to an outwardly extending flexible sealing skirt 48 that extends completely around the lower surface 45 thereof and outwardly from the body portion 47 in the manner illustrated in FIGS. 1-5, the flexible skirt 48 and the bottom surface 45 of the valve member 28 each being arcuate in cross-section as illustrated in the drawings to closely mate with the arcuate surface 32 of the valve seat means 36 as illustrated in FIGS. 3 and 4. In this manner, the lower arcuate surface 49 of the flexible skirt 48 is adapted to be disposed in sealing engagement against the arcuate surface 32 of the valve seat means 36 while permitting sliding movement relative thereto.

The flexible skirt 48 can be rendered more flexible by providing an annular groove therein adjacent the main body 47 of the valve member 28 if desired and when the aforementioned plastic material is being utilized to form the valve member 28, the flexible skirt can be approximately 0.030 of an inch thick to render the same flexible for sealing purposes hereinafter described.

The lower arcuate surface 45 of the valve member 28 is interrupted by the passage or cavity 46 so that the cavity 46 can bridge the ports 37 and 38 or 38 and 39 together for the reasons previously set forth while the pressure in the intermediate main chamber 35 of the housing 21 acts against the upper surface 50 of the flexible skirt 48 to flex and urge the same outwardly against the arcuate surface 32 of the valve seat means 32 to further assist in the sealing effect of the flexible skirt 48 about the cavity 46 as the flexible skirt 48 tends to sealingly conform to the contour of the surface 32 of the valve seat means 36.

In this manner, not only does the natural bias of the flexible skirt 48 provide for sealing against the valve seat surface 36, but also the force of the pressure fluid in the chamber 35 causes the flexible skirt 48 to seal and conform to the contour of the surface 32 of the valve seat means 36 and take up any tolerances that exist between the surface 45 of the valve member 28 and the surface 32 of the valve seat means 36.

The flexible skirt 48 of the valve member 28 has the opposed ends 51 and 52 thereof respectively provided with cutouts 53 and 54 so that the cutout 53 will fully expose the port 37 to the chamber 35 when the valve member is moved to the right from the position illustrated in FIG. 1 to interconnect the ports 38 and 39 together. Conversely, when the valve member 28 is moved to the left, as illustrated in FIG. 1, to cause the cavity 46 to bridge the ports 37 and 38, the cutout 54 fully exposes the port 39 to the intermediate chamber 35 for the reasons previously set forth.

In this manner, it can be seen that the valve member 29 and its integral, homogeneous flexible sealing skirt 48 can be simply formed by a molding operation to cause the valve member 28 to operate in a manner hereinafter described.

Figure 2:
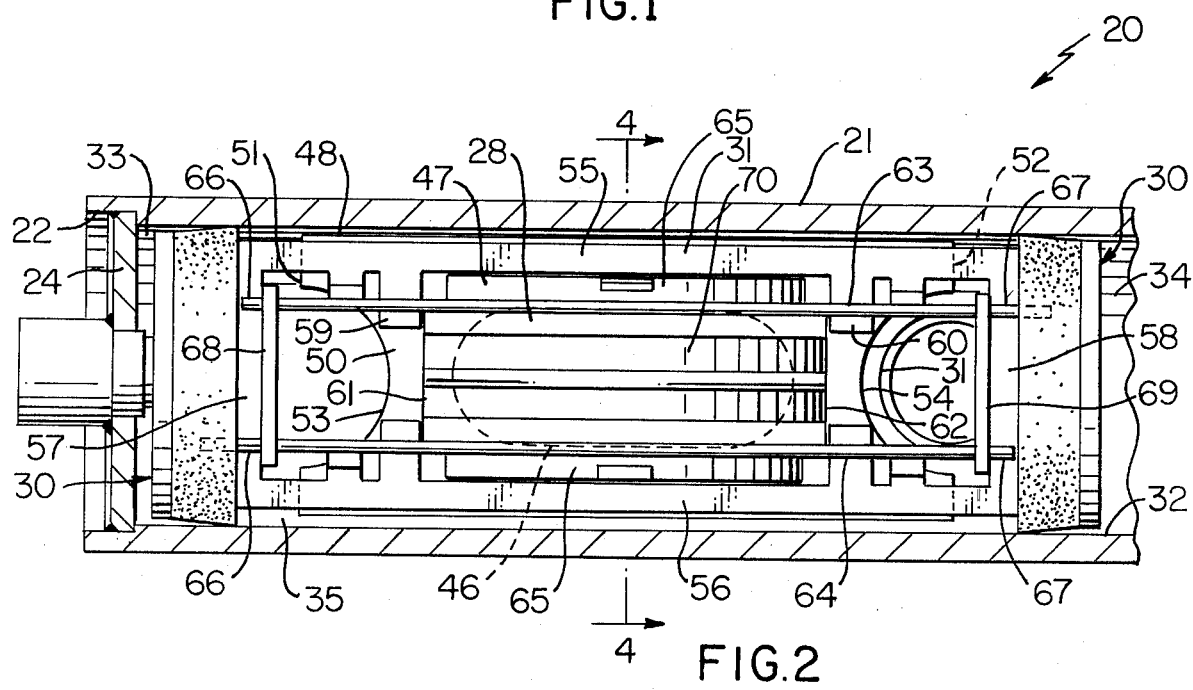
FIG. 2 is an enlarged, fragmentary, cross-sectional view taken on line 2—2 of FIG. 1.

The guide bar 31 of the piston unit 29 is defined by a pair of substantially parallel and spaced apart legs 55 and 56 as illustrated in FIG. 2 interconnected together at opposed ends by cross members 57 and 58 respectively secured to the piston assemblies 30 as illustrated. In this manner, the valve member 28 is adapted to float upwardly and downwardly between the legs 55 and 56 as illustrated in FIG. 2, the legs 55 and 56 respectively having a pair of inwardly directed tangs 59 and 60 respectively disposed adjacent opposed ends 61 and 62 of the body portion 47 of the valve member 28 so as to cause axial movement of the valve member 28 with the piston unit 29 through the abutment of the tangs 59 or 60 with the body portion 47 of the valve member 28 even though the valve member 28 is adapted to float upwardly and downwardly relative to the guide bar 31 and not impose any forces on the piston assemblies 30 in the sealing function with the internal peripheral surface 32 of the housing member 21.

However, in order to urge the valve member 28 into sealing engagement with the valve seat means 36, a pair of spring rods 63 and 64 are adapted to engage against the top surface 65 of the body portion 47 of the valve member 28 in a bowed manner and have the opposed ends 66 and 67 thereof disposed through suitable openings formed in upstanding flanges 68 and 69 of the guide bar 31 so that the force of the bowed spring rods 63 and 64 tend to urge the valve member 28 toward the valve seat means 36 during the entire time the valve member 28 is operatively associated with the piston unit 29 whether the same is in its stationary condition or being moved therewith.

As previously stated, one of the features of this invention is to prevent any adverse turbulence in the flow of fluid through the reversing valve construction 20 not only in the cavity 46 of the valve member 28 thereof, but also external of the valve member 28 so as to lower the pressure drop in the reversing valve construction 20.

This feature is accomplished through the unique configuration of the valve member 28 as the external surface of the body portion 47 thereof is formed with an arcuate or domed central portion 70 which is substantially semicircular in the cross-sectional configuration thereof that is taken in a direction parallel to the aligned ports 37–39 whereby the flow of fluid passing from the upper conduit 43 to the exposed conduit 40 or 42 is substantially turbulent-free in the manner represented by the flow pattern arrows 71 in FIG. 6.

The cavity 46 of the valve member 28 of this invention also provides for a smooth flow pattern as provided by the flow path arrows 72 in FIG. 6 regardless of which pair of ports 37 and 38 or 38 and 39 is being interconnected together thereby because the cavity 46 is so molded that the same has a substantially semicircular cross-sectional configuration when taken in a direction parallel to the aligned ports 37 and 39 with such semicircular configuration having a radius with a length which extends from a point substantially equidistant between two of the ports 37 and 38 or 38 and 39 as fully illustrated in FIG. 1. The cavity 46 also has a cross-sectional configuration in a direction transverse to the aligned ports 37–39 which has a substantially semicircular top portion 73 as illustrated in FIG. 4 with a diameter that extends substantially between diametrically opposed edges of any one of the ports 37, 38 or 39, the cross-sectional configuration in the transverse direction as illustrated in FIG. 4 having substantially parallel sides 74 and 75 between the semicircular top portion 73 thereof and the valve seat means 36 with the parallel sides 74 and 75 being substantially as wide apart as the diametrically opposed edges as any one of the ports 37, 38 or 39.

In this manner, it can be seen that the unique valve member 28 of this invention provides for substantially turbulent-free flow of the fluid in the reversing valve construction 20 not only internally through the cavity 47 thereof but also externally thereof as the external semicircular portion 70 thereof is concentric with the semicircular internal cross-sectional configuration illustrated in FIG. 1 to permit such smooth external fluid flow between the inlet conduit 43 and the exposed conduit 42 or 40 as the case may be.

As the valve member 28 of the valve construction 20 is shifted from right to left or left to right in the tubular housing means 21, in the same manner and for the same purposes as previously described, it can be seen that the arcuate flexible skirt 48 slides in sealing engagement against the arcuate surface 32 of the valve seat means 36 to seal the resulting interconnected ports 37 and 38 or 38 and 39 from the intermediate pressurized chamber 35 of the tubular housing member 21 while fluidly interconnecting the particular pair of ports together as previously set forth, the arcuate flexible skirt 48 being continuously flexed and urged into sealing engagement with the arcuate surface 32 of the valve seat means 36 not only by the natural resiliency of the flexible skirt 48, but also by the pressure in the chamber 35 acting on the upper surface 50 thereof so that the flexible skirt 48 has its lower surface 49 conformed to the contour of the surface 32 of the valve seat means 36 in a more effective manner than the cooperating flat metallic surfaces of prior known reversing valve constructions.

Therefore, it can be seen that the reversing valve construction 20 of this invention provides a flexible sealing skirt 48 on the valve member 28 to seal the cavity 46 of the movable piston-like valve member 28 to the valve seat means 36 while permitting sliding movement therebetween in a manner belived to produce a more efficient reversing valve construction than prior known reversing valve constructions.

However, it was found according to the teachings of this invention that the sealing effect of the flexible skirt 48 against the arcuate surface 32 of the valve seat means 36 can be improved to further lower the pressure drop across the valve member 28 if a biasing means also acts on the flexible skirt 48 thereof.

Accordingly, another reversing valve construction of this invention is generally indicated by the reference numeral 20A in FIGS. 7-10 and parts thereof similar to the reversing valve construction 20 previously described are indicated by like reference numerals followed by the reference letter "A".

As illustrated in FIG. 7, the piston unit 29A for the valve member 28A has been changed so that a metallic spring member 76 can be disposed between the legs 55A and 56A of the guide bar 31A and the opposed side edges 77 and 78 of the flexible skirt 48A of the valve member 28A, the spring member 76 having a pair of curled legs 79 and 80 each of which makes line contact from the opposed ends 51A and 52A of the flexible skirt 48A on one of the opposite sides of the aligned ports 37A-39A as illustrated.

In order to have the curled legs 79 and 80 of the spring member 76 relatively short, the guide bar 31A can be provided with depending tangs 81 at the cross parts 57A and 58A thereof that are adapted to engage against the cross members 82 of the spring member 76 in the manner illustrated in FIG. 9 to urge the curled legs 79 and 80 into compression against the opposed sides 77 and 78 of the flexible skirt 48 of the valve member 28A.

Alternately, the legs 79 and 80 of the spring member 76 can be relatively long in the manner illustrated in FIG. 11 wherein the cross members 82 of the spring 76 rest against the underside of the legs 55A and 56A of the guide bar 31A when the tanges 81 are not utilized, the curled legs 79 and 80 of the spring 76 still being under compression between the guide bar 31A and the opposed sides 77 and 78 of the flexible skirt 48A of FIG. 11.

Figure 17:
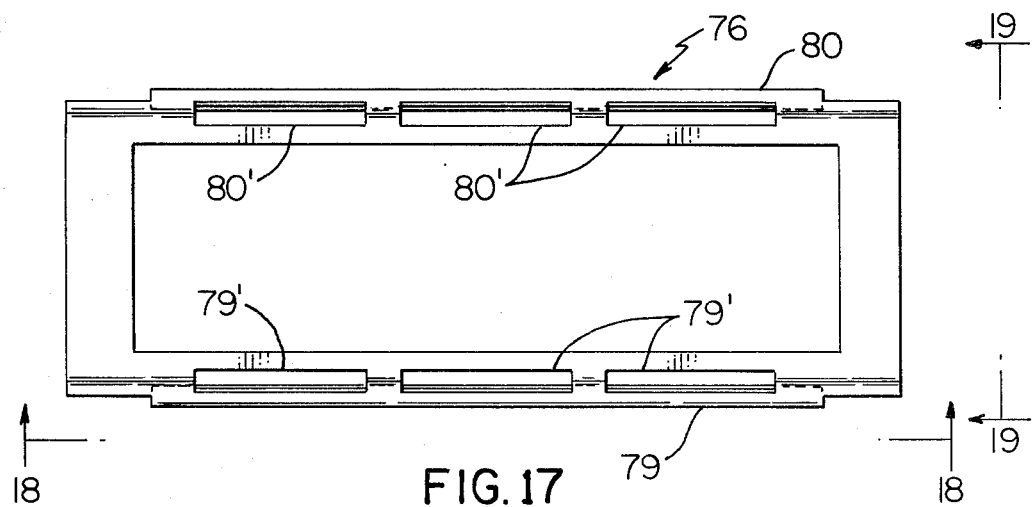
FIG. 17 is a top view of the improved skirt spring of the reversing valve construction illustrated in FIG. 11.
Figure 18:
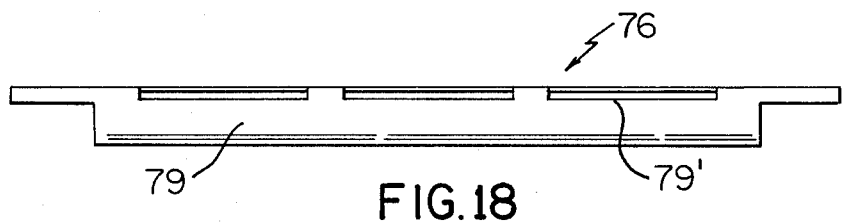
FIG. 18 is a side view of the spring of FIG. 17 and is taken in the direction of the arrows 18—18 of FIG. 17.
Figure 19:
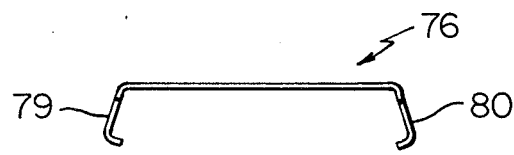
FIG. 19 is an end view of the spring illustrated in FIG. 17 and is taken in the direction of the arrows 19—19 of FIG. 17.
Figure 20:
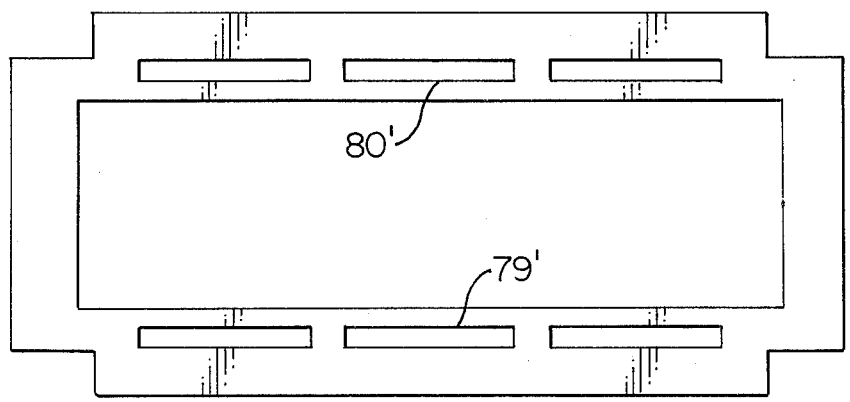
FIG. 20 is a top view of a blank from which the spring of FIG. 17 is formed.

In fact, the spring member 76 of FIG. 11 is a presently preferred form of the spring member for acting on the flexible skirt of the valve member of this invention and such presently preferred spring member 76 is best illustrated in FIGS. 17, 18 and 19 wherein it can be seen that the curled legs 79 and 80 thereof are made by curling the side edges of the spring blank illustrated in FIG. 20 after such blank has been weakened by cutouts 79' and 80'. In this manner, the relatively long legs 79 and 80 of the spring member 76 of FIGS. 17-19 are made more resilient by the cutouts 79' and 80' than if such weakening means 79' and 80' were not utilized.

In any event, it can be seen that in the operation of the reversing valve construction 20A, no other spring force is required to act on the body portion 47A of the valve member 28A, as provided by the rod springs 63 and 64 previously described, because the spring 76 provides the dual function of not only holding the valve member 28 into sealing relation with the arcuate surface 32A of the valve seat means 36A, but also the spring 76 holds the opposed edges 77 and 78 of the flexible skirt 48A into sealing relation with the arcuate surface 32A of the housing means 21A outboard of the body portion 47A to lower the pressure drop across the valve member 28A during operation of the reversing valve construction 20A in the manner previously described.

As previously described, it was found that when the valve member 28 or 28A of this invention is formed of the aforementioned plastic material or other plastic material, the same tends to be worn out by moving across the ports 37-39 or 37A-39A unless the ports 37-39 and 37A-29A are formed relatively smooth at the internal surface 32 of the housing member 21.

Accordingly, it is another feature of this invention to provide an improved housing member 21 for the reversing valve construction 20 or 20A of this invention and a method of this invention for making such an improved housing means 21 will now be described.

As illustrated in FIG. 12, the housing means 21 for the reversing valve construction 20 comprises a conventional open ended metallic tubular member 83 having a cylindrical internal peripheral surface 84 as well as a cylindrical external peripheral surface 85 as illustrated.

Initially, three relatively small openings, 86, 87 and 88 are drilled through the side wall means 89 of the tubular member 83 in the exact locations that the ports 37, 38 and 39 are to be subsequently formed. Likewise, a small opening 90 can be formed through the side wall means 89 opposite the aligned openings 86-88 to eventually form the port 44 previously described.

Figure 13:
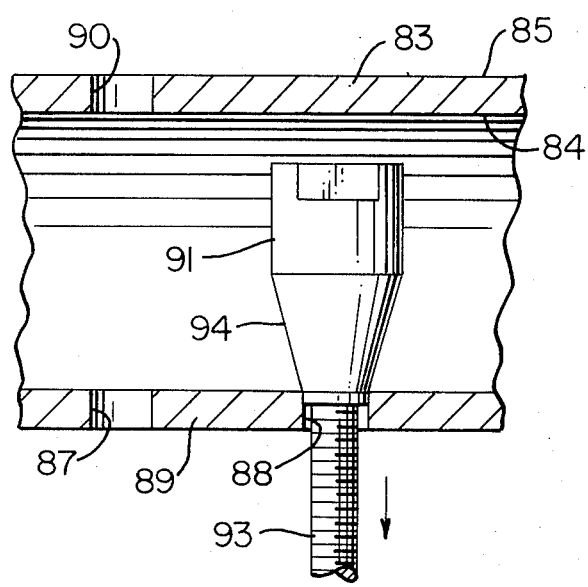
FIG. 13 is a fragmentary view similar to FIG. 12 and illustrates another step in the method of this invention.

Once the small openings 86, 87, 88 and 90 have been formed in the tubular member 83, a bullet-like drawing member 91 is disposed in the tubular member 83 through either opposed open end 92 thereof and the bullet 91 is suitably engaged, such as by inserting a threaded pulling member 93 illustrated in FIG. 13 through the desired opening 86, 87 or 88, so that the frusto-conical portion 94 of the bullet member 91 can be first pulled through the particular opening, such as opening 88 as illustrated in FIG. 13. In this manner, the opening 88 is drawn from the inside to the outside of the side wall means 89 in the manner illustrated in FIG. 14 to not only form the larger resulting port 39 of the desired size, but also to form a depending external collar 95 on the tubular member 83 in which the tubular connector 42 can be subsequently secured in any suitable manner.

Figure 14:
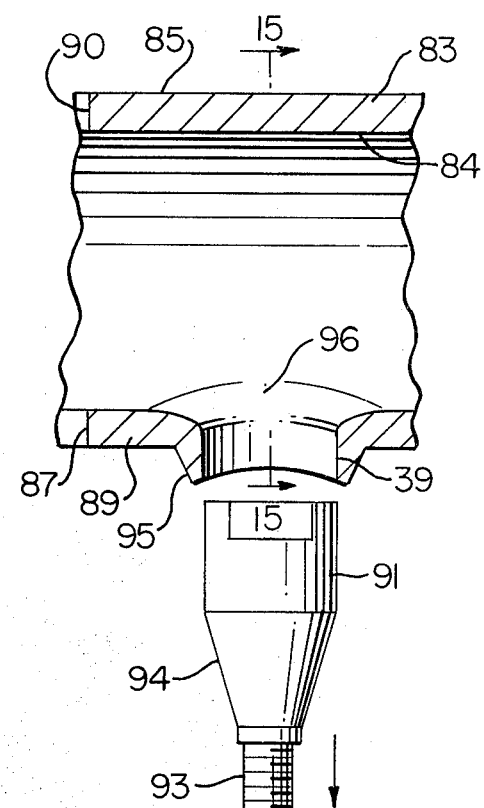
FIG. 14 is a view similar to FIG. 13 and illustrates another step in the method of this invention.

Such drawing operation for each of the openings 86, 87, 88 and 90 is performed in the same manner as illustrated in FIGS. 13 and 14 whereby a relatively large smooth annual depression 96 is formed around each port 37, 38 and 39 in the internal peripheral surface 32 which would be too large in diameter for the cavity 46 of the valve member 28 that has been sized for the particular ports 37-39.

Figure 15:
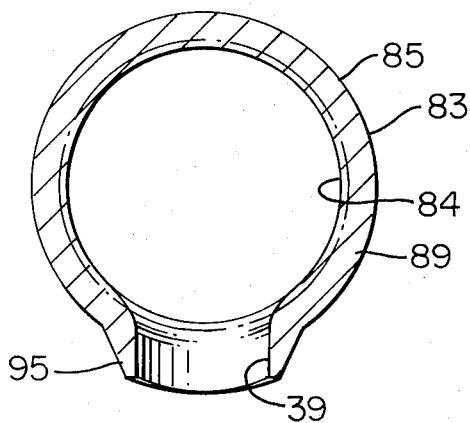
FIG. 15 is a cross-sectional view taken on line 15—15 of FIG. 14.
Figure 16:
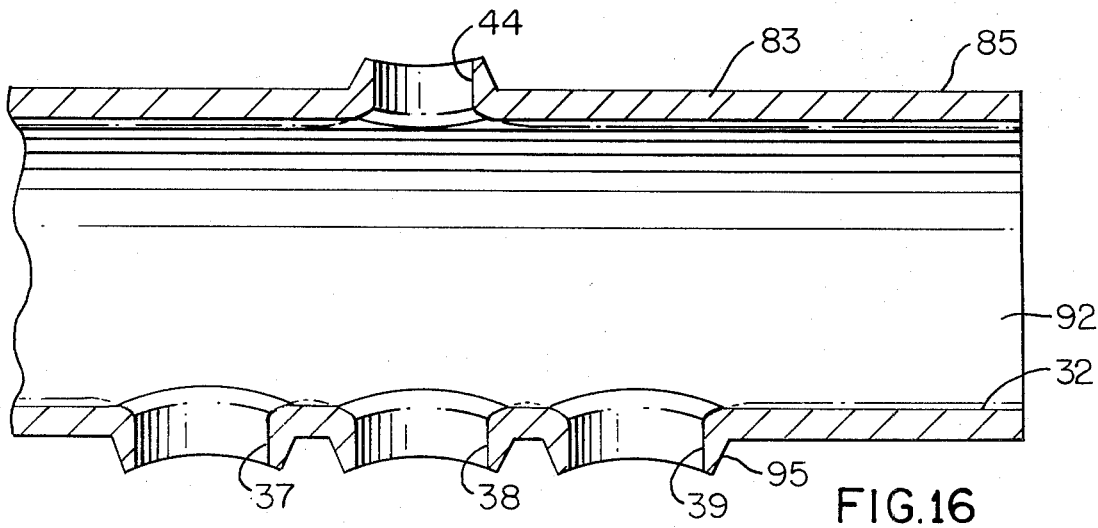
FIG. 16 is a view similar to FIG. 12 and illustrates the completed tubular housing means for a reversing valve construction as formed by the method of this invention.

Thus, subsequently, the tubular member 83 is reamed to not only accurately form the internal peripheral surface 32 thereof previously described to a substantially true cylinder, but also to reduce the diameters of the depressions 96 as the reaming operation removes the amount of metal represented by the dash-dotted lines in FIG. 15 from the internal side wall means 84 to produce the side wall means 32 illustrated in FIG. 16 wherein the dash-dotted lines of FIG. 16 represent the amount of metal that has been removed by the reaming operation of this invention.

Thus, it can be seen that the reaming operation of the tubular member 83 not only provides an arcuate cylindrical surface 32 for the piston assemblies 30 to seal against, but also the reaming operation reduces the diameters of the depressions 96 so that the same conform to the size of the cavity 46 of the valve member 28 whereby the flexible sealing skirt 48 can perform its sealing function around the reduced depressions 96 for the ports 37–39 in the manner previously described and will not be worn out by moving over the ports 37–39 because of the smooth annular depressions 96.

As previously stated, one of the features of this invention is to tend to prevent the high pressure differential acting across a valve member of a reversing valve construction from deforming the sidewall means of the valve member inwardly toward the cavity thereof to disrupt the desired smooth fluid flow therethrough.

Figure 21:
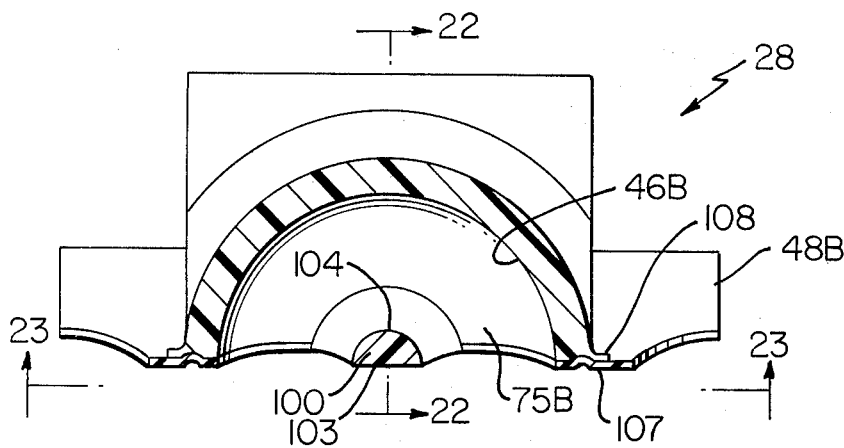
FIG. 21 is a cross-sectional view illustrating another embodiment of the improved valve member of this invention.
Figure 22:
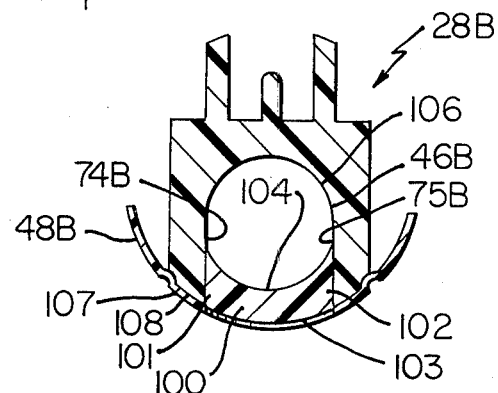
FIG. 22 is a cross-sectional view taken on line 22—22 of FIG. 21.
Figure 23:
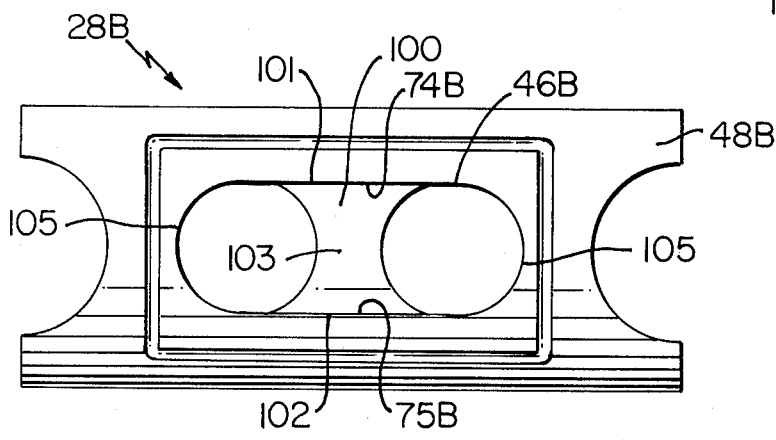
FIG. 23 is a bottom view of the valve member illustrated in FIG. 21 and is taken in the direction of the arrows 23—23 of FIG. 21.

Accordingly, another embodiment of the valve member of this invention is generally indicated by the reference numeral 20B in FIGS. 21–23 and parts thereof similar to the valve members 28 and 28A previously described are indicated by like reference numerals followed by the reference letter "B".

As illustrated in FIGS. 21–23, the valve member 28B has the cavity or passage means 46B formed of the same configuration as the passage means or cavity 46 previously described and additionally has a reinforcing cross member 100 disposed in the cavity 46B transversely across the same so that its opposed ends 101 and 102 can be respectively secured to the substantially vertical sidewalls 74B and 75B as illustrated in FIGS. 22 and 23.

The cross member 100 can be formed of the same material from which the body portion of the valve member 28B is formed and can have its opposed ends 101 and 102 secured to the sides 74B and 75B by being ultrasonically welded thereto, adhesively bonded thereto, etc., as desired.

In any event, the cross member 100 has a surface 103 adapted to be disposed adjacent the valve seat means of the reversing valve construction in such a manner that the same is adapted to be disposed closely adjacent such valve seat surface and substantially conformed to the contour thereof as illustrated in FIG. 22. The opposite surface 104 of the cross member 100 is so constructed and arranged that the same is substantially semicircular as illustrated in FIG. 21 and is disposed spaced from and concentric to the aforementioned semicircular configuration of the cavity 46B.

As illustrated in FIG. 23, the cross member 100 cooperates with the cavity 46B to define two substantially elliptically shaped openings 105 spaced from each other by the cross member 100 with such openings 105 adapted to be substantially aligned with two of the ports of the reversing valve seat means so as to provide full alignment therewith, the openings 105 being interconnected by a resulting passage 106 formed through the valve member 28B as illustrated in FIG. 22 with such passage 106 also having a substantially elliptical cross-sectional configuration.

It has been found that when providing the valve member 28B with the cross member 100, the resulting pressure differential acting across the valve member 28B in reversing valve construction use does not collapse the valve member 28B into the cavity 46B thereof because of the resistance provided by the reinforcing cross member 100, the cross member 100 still permitting a smooth flow of fluid through the cavity 46B in substantially the same manner as illustrated in FIG. 6 for the valve member 28 previously described.

In order to further prevent the pressure differential acting across the valve member 28B from collapsing the valve member 28B into the cavity 46B thereof, the valve member 28B can be formed of a relatively hard plastic material while the flexible skirt 48B can be formed of a relatively flexible material and be subsequently secured to the valve member 28B by having a portion 107 thereof secured to a corresponding portion 108 of the valve member 28B as illustrated in FIGS. 21 and 22. In this manner, the portion 107 of the flexible skirt 48B will be the only part of the valve member 28B which will engage against the valve seat surface of the reversing valve construction utilizing such valve member 28B.

Thus, the material for the body portion of the valve member 28B can be relatively rugged while the material for the skirt 48B can be relatively flexible and an antifriction material such as the aforementioned TEFLON-TFE.

In contrast, the body portion of the valve member 28B can be formed of any suitable harder plastic material, as desired.

The flexible skirt 48B can have its portion 107 secured to the part 108 of the valve member 28B in any suitable manner, such as being ultrasonically welded thereto, adhesively bonded thereto, or molded directly thereto by any well known molding process, as desired.

Of course, the skirt 48B could be integral and homogeneous with the remainder of the valve member 28B in the manner previously described and the valve member could be reinforced by the cross member 100 as well as by other reinforcing means if desired.

Figure 24:
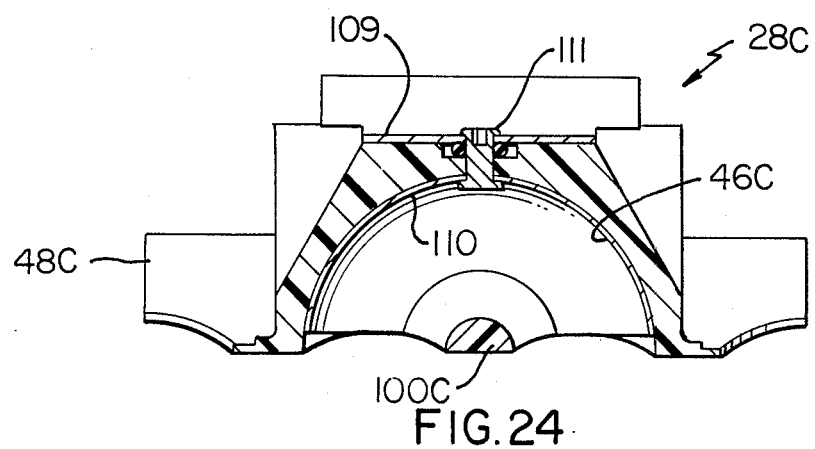
FIG. 24 is a view similar to FIG. 21 and illustrates another embodiment of the valve member of this invention.

For example, reference is now made to FIG. 24 wherein another valve member of this invention is generally indicated by the reference numeral 28C and parts thereof similar to the valve members 28, 28A and 28B previously described are indicated by like reference numerals followed by the reference letter "C".

As illustrated in FIG. 24, the skirt 48C is integral with the remainder of the valve member 28C and the cross member 100C is secured in the cavity 46C to reinforce the same. In addition, a properly shaped metal reinforcing member 110 is disposed in the cavity 46C against the valve member 28C and is secured therein by a rivet 111 also securing an outboard metal reinforcing member 109 to the valve member 28C as illustrated.

Therefore, it can be seen that the valve member 28C of FIG. 24 can be made of relatively flexible material so that the resulting skirt 48C will perform its sealing function while the body part of the valve member 28C will resist inward deforming thereof from the resulting pressure differential acting across the same not only because of the cross member 100C for the reasons previously set forth, but also because of the reinforcing members 110 and 109 added thereto.

Also, when the valve member 28C is being molded, reinforcing particles could be dispersed in the body portion thereof, if desired.

The operation of the valve members 28B and 28C previously described in reversing valve constructions are exactly the same as the valve members 28 and 28A previously described so that such operation of the valve members 28B and 28C in reversing valve constructions need not be repeated.

Therefore, it can be seen that this invention not only provides an improved reversing valve construction and method of making the same, but also this invention provides improved parts for such a reversing valve construction and methods of making the same.

While the forms and methods of this invention now preferred have been illustrated and described as required by the Patent Statute, it is to be understood that other forms and method steps can be utilized and still fall within the scope of the appended claims.

What is claimed is:

1. In a reversing valve construction having a housing means provided with a chamber carrying a movable valve member therein that controls port means of a valve seat means of said housing means through the relative position of passage means of said valve member relative to said port means, the improvement comprising a flexible sealing skirt carried by said valve member and extending outwardly therefrom adjacent said valve seat means so as adapted to be exposed to fluid pressure in said chamber that will act directly thereon and cause said flexible skirt to flex and engage said valve seat means in a manner to tend to sealingly conform to the contour of said valve seat means and thereby seal said passage means to said valve seat means while permitting sliding movement therebetween, biasing means in said housing means and acting on said flexible skirt to urge the same toward said valve seat means, and a piston unit disposed in said housing means and being operatively interconnected with said valve member to move the same relative to said valve seat means, said biasing means being under compression between said piston unit and said flexible skirt, said valve member being adapted to float relative to said piston unit, said port means comprising first, second, and third ports disposed in aligned relation and said passage means comprising a cavity in said valve member that will bridge said first and second ports while exposing said chamber to said third port when said valve member is in one position thereof and will bridge said second and third ports while exposing said chamber to said first port when said valve member is in another position thereof, said flexible skirt being annular and surrounding said cavity of said valve member, said biasing means engaging said flexible skirt on opposite sides of said aligned ports, said biasing means engaging said flexible skirt in a straight line manner between opposed ends of said skirt on opposite sides of said aligned ports, said flexible skirt being an integral and homogeneous part of said valve member.

2. In a reversing valve construction having a housing means provided with a chamber carrying a movable valve member therein that controls port means of a valve seat means of said housing means through the relative position of passage means of said valve member relative to said port means, the improvement comprising a flexible sealing skirt carried by said valve member and extending outwardly therefrom adjacent said valve seat means so as adapted to be exposed to fluid pressure in said chamber that will act directly thereon and cause said flexible skirt to flex and engage said valve seat means in a manner to tend to sealingly conform to the contour of said valve seat means and thereby seal said passage means to said valve seat means while permitting sliding movement therebetween, said flexible sealing skirt being formed of a material that is more flexible than the material from which said valve member is formed, said flexible skirt comprising one plastic material and said valve member comprising another plastic material joined to said one plastic material.

3. A reversing valve construction as set forth in claim 2 wherein said skirt has a portion thereof disposed between said valve member and said valve seat so that said valve member does not engage said valve seat.

4. A reversing valve construction as set forth in claim 3 wherein said passage means has an outboard edge and said portion of said skirt completely extends to and surrounds said outboard edge of said passage means.

5. In a valve member for a reversing valve construction having a housing means provided with a chamber for carrying said valve member therein to control port means of a valve seat means of said housing means through the relative position of passage means of said valve member relative to said port means, the improvement comprising a flexible sealing skirt carried by said valve member and extending outwardly therefrom so as to be adapted to be disposed adjacent said valve seat means and be exposed to fluid pressure in said chamber that will act directly thereon and cause said flexible skirt to flex and engage said valve seat means in a manner to tend to sealingly conform to the contour of said valve seat means and thereby seal said passage means to said valve seat means while permitting sliding movement therebetween, said flexible sealing skirt being formed of a material that is more flexible than the material from which said valve member is formed, said flexible skirt comprising one plastic material and said valve member comprising another plastic material joined to said one plastic material.

6. A valve member for a reversing valve construction as set forth in claim 5 wherein said skirt has a portion thereof adapted to be disposed between said valve member and said valve seat so that said valve member will not engage said valve seat.

7. A valve member for a reversing valve construction as set forth in claim 6 wherein said passage means has an outboard edge and said portion of said skirt completely extends to and surrounds the outboard edge of said passage means.

8. In a reversing valve construction having a housing means provided with a chamber carrying a movable valve member therein that controls port means of a valve seat means of said housing means through the relative position of a cavity of said valve member relative to said port means, said port means comprising first, second and third ports in aligned relation and said cavity bridging said first and second ports while exposing said chamber to said third port when said valve member is in one position thereof and bridging said second and third ports while exposing said chamber to said first port when said valve member is in another position thereof, the improvement wherein said cavity has a cross-sectional configuration in a direction parallel with said aligned ports that is substantially semicircular with a radius that extends from a point that is substantially equidistant between two of said ports and a point on the outboard edge of either of said two ports, said cavity having a cross-sectional configuration in a direction transverse to said aligned ports that has a substantially semicircular top with a diameter that extends substantially between diametrically opposed edges of one of said ports, and a cross member disposed in said cavity of said valve member to be carried thereby and disposed transverse to said aligned ports so as to be intermediate the two ports being bridged by said cavity, said cross member having a surface thereof disposed closely adjacent said valve seat.

9. In a reversing valve construction having a housing means provided with a chamber carrying a movable valve member therein that controls port means of a valve seat means of said housing means through the relative position of a cavity of said valve member relative to said port means, said port means comprising first, second and third ports in aligned relation and said cavity bridging said first and second ports while exposing said chamber to said third port when said valve member is in one position thereof and bridging said second and third ports while exposing said chamber to said first port when said valve member is in another position thereof, the improvement wherein said cavity has a cross-sectional configuration in a direction parallel with said aligned ports that is substantially semicircular with a radius that extends from a point that is substantially equidistant between two of said ports and a point on the outboard edge of either of said two ports, said cavity having a cross-sectional configuration in a direction transverse to said aligned ports that has a substantially semicircular top with a diameter that extends substantially between diametrically opposed edges of one of said ports, and a cross member disposed in said cavity of said valve member to be carried thereby and disposed transverse to said aligned ports so as to be intermediate the two ports being bridged by said cavity, said cross member having a cross-sectional surface in a direction parallel with said aligned ports that is substantially semicircular with a radius that extends from a point that is substantially equidistant between two of said ports and a point on the inboard edge of either of said two ports, said surface being spaced from and substantially concentric with said semicircular cross-sectional configuration of said cavity.

10. In a reversing valve construction having a housing member provided with a chamber carrying a movable valve member therein that controls port means of a valve seat means of said housing means through the relative position of a cavity of said valve member relative to said port means, said port means comprising first, second and third ports in aligned relation and said cavity bridging said first and second ports while exposing said chamber to said third port when said valve member is in one position thereof and bridging said second and third ports while exposing said chamber to said first port when said valve member is in another position thereof, the improvement wherein said cavity has a cross-sectional configuration in a direction parallel with said aligned ports that is substantially semicircular with a radius that extends from a point that is substantially equidistant between two of said ports and a point on the outboard edge of either of said two ports, said cavity having a cross-sectional configuration in a direction transverse to said aligned ports that has a substantially semicircular top with a diameter that extends substantially between diametrically opposed edges of one of said ports, and a cross member disposed in said cavity of said valve member to be carried thereby and disposed transverse to said aligned ports so as to be intermediate the two ports being bridged by said cavity, said cross member having a configuration that cooperates with said cavity to define a pair of spaced substantially elliptical openings leading into said cavity to be respectively aligned with the two ports being bridged by said cavity.

11. A reversing valve construction as set forth in claim 10 wherein said configuration of said cross member cooperates with said cavity to define a passage between said openings with said passage having a substantially elliptical cross-sectional configuration.

12. In a valve member for a reversing valve construction having a housing means provided with a chamber carrying said valve member therein to control port means of a valve seat means of said housing means through the relative position of a cavity of said valve member relative to said port means, said port means comprising first, second and third ports in aligned relation and said cavity being adapted to bridge said first and second ports while exposing said chamber to said third port when said valve member is in one position thereof and bridge said second and third ports while exposing said chamber to said first port when said valve member is in another position thereof, the improvement wherein said cavity has a cross-sectional configuration in a direction adapted to be parallel with said aligned ports that is substantially semicircular with a radius that is adapted to extend from a point that is substantially equidistant between two of said ports and a point on the outboard edge of either of said two ports, said cavity having a cross-sectional configuration in a direction adapted to be transverse to said aligned ports that has a substantially semicircular top with a diameter that is adapted to extend substantially between diametrically opposed edges of one of said ports, and a cross member disposed in said cavity of said valve member to be carried thereby and disposed transverse to said aligned ports so as to be intermediate the two ports to be bridged by said cavity, said cross member having a surface thereof adapted to be disposed closely adjacent said valve seat.

13. In a valve member for a reversing valve construction having a housing means provided with a chamber carrying said valve member therein to control port means of a valve seat means of said housing means through the relative position of a cavity of said valve member relative to said port means, said port means comprising first, second and third ports in aligned relation and said cavity being adapted to bridge said first and second ports while exposing said chamber to said third port when said valve member is in one position thereof and bridge said second and third ports while exposing said chamber to said first port when said valve member is in another position thereof, the improvement wherein said cavity has a cross-sectional configuration in a direction adapted to be parallel with said aligned ports that is substantially semicircular with a radius that is adapted to extend from a point that is substantially equidistant between two of said ports and a point on the outboard edge of either of said two ports, said cavity having a cross-sectional configuration in a direction adapted to be transverse to said aligned ports that has a substantially semicircular top with a diameter that is adapted to extend substantially between diametrically opposed edges of one of said ports, and a cross member disposed in said cavity of said valve member to be carried thereby and disposed transverse to said aligned ports so as to be intermediate the two ports to be bridged by said cavity, said cross member having a cross-sectional surface in a direction adapted to be parallel with said aligned ports that is substantially semicircular with a radius that is adapted to extend from a point that is substantially equidistant between two of said ports and a point on the inboard edge of either of said two ports, said surface being spaced from and substantially concentric with said semicircular cross-sectional configuration of said cavity.

14. In a valve member for a reversing valve construction having a housing means provided with a chamber carrying said valve member therein to control port means of a valve seat means of said housing means through the relative position of a cavity of said valve member relative to said port means, said port means comprising first, second and third ports in aligned relation and said cavity being adapted to bridge said first and second ports while exposing said chamber to said third port when said valve member is in one position thereof and bridge said second and third ports while exposing said chamber to said first port when said valve member is in another position thereof, the improvement wherein said cavity has a cross-sectional configuration in a direction adapted to be parallel with said aligned ports that is substantially semicircular with a radius that is adapted to extend from a point that is substantially equidistant between two of said ports and a point on the outboard edge of either of said two ports, said cavity having a cross-sectional configuration in a direction adapted to be transverse to said aligned ports that has a substantially semicircular top with a diameter that is adapted to extend substantially between diametrically opposed edges of one of said ports, and a cross member disposed in said cavity of said valve member to be carried thereby and disposed transverse to said aligned ports so as to be intermediate the two ports to be bridged by said cavity, said cross member having a configuration that cooperates with said cavity to define a pair of spaced substantially elliptical openings leading into said cavity to be adapted to be respectively aligned with the two ports to be bridged by said cavity.

15. A valve member for a reversing valve construction as set forth in claim 14 wherein said configuration of said cross member cooperates with said cavity to define a passage between said openings with said passage having a substantially elliptical cross-sectional configuration.

* * * * *